(12) United States Patent
Conger et al.

(10) Patent No.: US 10,308,085 B2
(45) Date of Patent: Jun. 4, 2019

(54) TOW KIT HAVING THIMBLE SLIDER

(71) Applicant: Actuant Corporation, Menomonee Falls, WI (US)

(72) Inventors: Wesley Paul Conger, Houston, TX (US); Adam Ross Baldwin, Waukesha, WI (US); Luis S. Padilla, Katy, TX (US); Michael Charles Greenwood, Santa Barbara, CA (US); Dennis J. Weber, Edwards, IL (US); Brett Edward Burke, Washburn, IL (US)

(*) Notice: Subject to any disclaimer, the term of this patent is extended or adjusted under 35 U.S.C. 154(b) by 73 days.

(21) Appl. No.: 15/565,311

(22) PCT Filed: Dec. 22, 2015

(86) PCT No.: PCT/US2015/067398
§ 371 (c)(1),
(2) Date: Oct. 9, 2017

(87) PCT Pub. No.: WO2016/086237
PCT Pub. Date: Jun. 2, 2016

(65) Prior Publication Data
US 2018/0105001 A1    Apr. 19, 2018

Related U.S. Application Data

(60) Provisional application No. 62/083,697, filed on Nov. 24, 2014.

(51) Int. Cl.
*B60D 1/18*    (2006.01)

(52) U.S. Cl.
CPC ..................... *B60D 1/18* (2013.01)

(58) Field of Classification Search
CPC .......... B60D 1/18; B60D 1/182; B60D 1/187; B60D 1/327
(Continued)

(56) References Cited

U.S. PATENT DOCUMENTS 2,381,193 A     8/1945  Vaszin
3,083,991 A  *  4/1963  Gale ...................... F16G 11/02
                                                       16/108

(Continued)

FOREIGN PATENT DOCUMENTS

CN      202022653     11/2011
RU       2361749       7/2009

OTHER PUBLICATIONS

International Search Report and Written Opinion for PCT/US2015/067398 dated Mar. 29, 2016.

(Continued)

*Primary Examiner* — Tony H Winner
*Assistant Examiner* — Conan D Duda
(74) *Attorney, Agent, or Firm* — Joseph T. Miotke; DeWitt LLP

(57) ABSTRACT

A tow kit is disclosed having a thimble slider engaged with a plurality of tethers. The thimble slider may have a generally C-shaped body with a back portion and opposing end portions. The thimble slider may also have a channel formed within outer surfaces of the back and opposing end portions, and an elongated separator connected to an inner surface of the back portion and extending in a direction generally orthogonal to the back portion to define two portions. A tether can engage the channel to equally distribute weight applied to the two ends of the tether. A sling can engage the inner surface of the back portion. At least one other tether can engage the sling.

17 Claims, 6 Drawing Sheets

(58) Field of Classification Search
USPC .......................................................... 280/480
See application file for complete search history.

(56) References Cited

U.S. PATENT DOCUMENTS

| | | | | |
|---|---|---|---|---|
| 3,656,293 | A * | 4/1972 | Lowery, Sr. | ............ F16G 15/06 59/86 |
| 3,932,697 | A * | 1/1976 | Hood | ..................... D07B 1/185 174/79 |
| 5,988,929 | A * | 11/1999 | Doan | ........................ E02F 3/60 24/136 K |
| 7,743,597 | B2 * | 6/2010 | Shnayder | ................ B63B 21/04 24/3.4 |
| 8,517,439 | B2 * | 8/2013 | Haun | ........................ B66C 1/36 294/74 |
| 8,636,297 | B2 * | 1/2014 | Merten | .................... B60D 1/02 280/480 |
| 2010/0281656 | A1 * | 11/2010 | Naquin | .................. B63B 21/20 24/127 |
| 2011/0074133 | A1 | 3/2011 | Sparkes | |
| 2011/0221167 | A1 * | 9/2011 | Merten | .................... B60D 1/02 280/504 |

OTHER PUBLICATIONS

Examination Report for Australian Patent Application No. 2015353391 dated Dec. 17, 2018.

\* cited by examiner

TOW KIT HAVING THIMBLE SLIDER

CROSS REFERENCE TO RELATED APPLICATIONS

This application is the U.S. national stage application of International Application Number PCT/US2015/067398, filed Dec. 22, 2015, which International Application was published on Jun. 2, 2016, as International Publication Number WO2015/086237. The International Application claims the benefit of prior-filed, U.S. Provisional Patent Application No. 62/083,697, filed Nov. 24, 2014, the entire contents of which are incorporated herein by reference. This application further claims the benefit of prior-filed, co pending PCT International Patent Application Number PCT/US2015/062460 filed on Nov. 24, 2015, the entire contents of which are incorporated herein by reference (although this second priority claim statement to PCT/US2015/062460 may not be necessary upon restoration to Nov. 24, 2014 of the right of priority of this application).

TECHNICAL FIELD

The present disclosure relates generally to a tow kit and, more particularly, to a tow kit having a thimble slider.

BACKGROUND

Machines such as articulated trucks, off-highway haul trucks, scrapers, wheel loaders, wheel dozers, motor graders, and wheeled excavators are each equipped with mounting brackets configured to receive tow hardware. When a particular machine becomes stuck or inoperable, shackles are connected to the mounting brackets of the machine and also to the mounting brackets of a tow machine. A block-and-pulley system is then strung between the shackles of both machines and used to pull the stuck machine onto ground better able to support the machine or into a repair facility.

While the standard shackle and block-and-pulley arrangement may be suitable for some applications, it can be problematic for other applications. In particular, in large machine applications, each component of the arrangement can be too heavy for a single technician to handle alone. In addition, it may be possible for the stuck machine and the tow machine to be out of alignment with each other, and the standard arrangement may not allow for proper load balancing in this situation. An unbalanced load can cause ropes of the block-and-pulley to wear excessively or even break.

An alternative tow kit is disclosed in U.S. Pat. No. 2,381,193 of Vaszin that issued on Aug. 7, 1945 ("the '193 patent"). In particular, the '193 patent discloses a towline thimble having a main body portion cast as a single unit and forming a horseshoe-shaped channel for receiving a rope. A tubular rubber sleeve surrounds the rope within the horseshoe-shaped channel to protect the rope from being cut by metallic edges of the main body. A web portion is centrally disposed within the main body portion, and extensions cooperate with the web portion to form a clevis that receives a tow bar.

While the towline thimble of the '193 patent may be an improvement over a traditional block-and-pulley arrangement, it may still be less than optimal. In particular, it may be difficult and/or time consuming in some applications to feed the rope through the horseshoe-shaped channel. This may be particularly true in large machine applications, where the ropes are large and stiff. In addition, the thimble of the '193 patent may be prone to twisting during use, which can unbalance the tow assembly and cause excessive wear of the tow ropes. Further, the thimble may not be strong enough for some applications.

The disclosed tow kit is directed to overcoming one or more of the problems set forth above and/or other problems of the prior art.

SUMMARY

In one aspect, the present disclosure is directed to a thimble slider. The thimble slider may include a generally C-shaped body with a back portion and opposing end portions. The thimble slider may also include a channel formed within outer surfaces of the back and opposing end portions, and an elongated separator connected to an inner surface of the back portion and extending in a direction generally orthogonal to a length direction of the back portion.

In yet another aspect the present disclosure is directed to a tow kit for connecting a first machine to a second machine. The tow kit may include a thimble slider having a generally C-shaped body with a back portion and opposing end portions, a generally semi-circular channel formed within outer surfaces of the back and opposing end portions, and a polymer coating applied to the generally semi-circular channel. The thimble slider may also have an elongated separator connected to an inner surface of the back portion and extending in a direction generally orthogonal to a length direction of the back portion. The elongated separator may divide an interior of the generally C-shaped body into a first space and a second space. The thimble slider may further have a release guard removably connected to a side of the elongated separator opposite the back portion of the generally C-shaped body. The tow kit may also include a sling having a first end passing through the first space in the generally C-shaped body of the thimble slider, and a second end passing through the second space. The tow kit may additionally include at least a first tether passing through the channel of the thimble slider and having ends received within the channels of the at least one roller shackle, and at least a second tether having a first end configured to receive the sling and a second end connected to the second machine.

In some embodiments, the tow kit may further include at least one roller shackle connected to the first machine and including a pin having a center portion receivable by the at least one of the first and second machines, a first land located at a first end of the center portion, a second land located at a second end of the center portion, and grooves separating the center portion from the first and second lands. The at least one roller shackle may also have retainers engaged with the grooves to lock the pin in place relative to at least one of the first and second machines, a first roller slidingly received over the first land, and a second roller slidingly received over the second land. Each of the first and second rollers may have a channel formed within an outer annular surface. The roller shackle may further have at least one retaining plate associated with an outer end each of the first and second rollers and configured to engage the pin.

DETAILED DESCRIPTION

Figure 1:
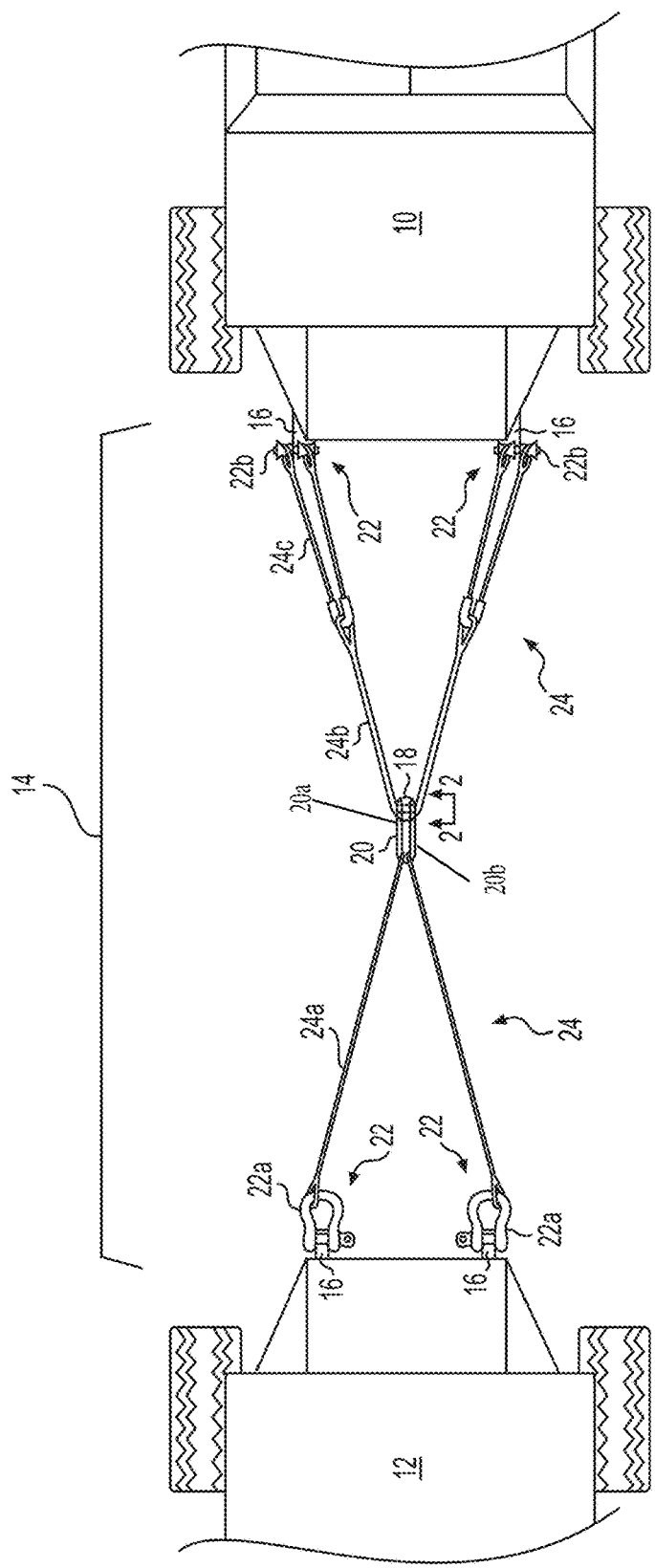
FIG. 1 is an diagrammatic illustration of an exemplary disclosed tow kit used to couple multiple machines.

FIG. 1 illustrates a first machine 10 connected to a second machine 12 by way of an exemplary tow kit 14. In this embodiment, machine 10 may be stuck or otherwise non-functional, and unable to propel itself. In contrast, machine 12 may be located on more secure ground and capable of both propelling itself and pulling machine 10. In the disclosed embodiment, machines 10 and 12 are each off-highway mining trucks having a gross vehicle weight of about 75-700 tons. It is contemplated, however, that tow kit 14 may be used with different types of machines and/or with machines having a different gross vehicle weight, if desired. For example, tow kit 14 could also or alternatively be used with marine vessels that are heavier or lighter than machines 10 and 12.

Tow kit 14 may be configured to connect to each of machines 10, 12 at two spaced apart locations and to distribute a towing load substantially equally between the locations. In the disclosed example, tow kit 14 is connected to a frame at a leading end of each machine 10, 12. It is contemplated, however, that tow kit 14 could alternatively be connected at a trailing end of one or both of machines 10, 12. In some examples, the tow kit connection to the frame may be achieved indirectly via a bumper. In other examples, the tow kit connection to the frame may be achieved directly. In both examples, a support member such as a bracket 16 may extend from the bumper or frame at the spaced apart locations to receive connection hardware of tow kit 14.

Tow kit 14 may consist of multiple different components that interact with each other to transfer forces between machine 10 and machine 12. These components may include, among other things, a thimble slider 18, a sling 20 connected to one end of thimble slider 18, a shackle 22 connected to each bracket 16, and a plurality of tethers 24 extending from shackles 22 at machine 10 to thimble slider 18 and from shackles 22 at machine 12 to sling 20. In the disclosed example two different types of shackles 22 are shown, including a traditional shackle 22a associated with machine 12, and a roller shackle 22b associated with machine 10. It is contemplated, however, that tow kit 14 could include only traditional shackles 22a or only roller shackles 22b, and/or that the position of shackles 22 may be reversed (i.e., shackle 22a may be used with machine 10 and shackles 22b may be used with machine 12), if desired. Tow kit 14 may be designed to be carried and installed by a single technician and, as such, each component may weigh less than about 50 lbs.

As shown in FIG. 1, multiple different kinds of tethers 24 may be included within tow kit 14. In particular, the exemplary configuration includes three types of tethers 24. A first type of tether 24a may have a single eye formed at each end, and a protective sheath or guard placed over one or both eyes. One eye of the first type of tether 24a may connect to a traditional shackle 22a at machine 12, while the other eye may pass over a mid-portion of sling 20. A second type of tether 24b may be similar to the first tether type 24a, but include an additional sheath or guard located at its center that wraps around thimble slider 18. Both eyes of the second type of tether 24b may connect to the center of a third type of tether 24c, which may extend back to roller shackles 22b at machine 10. The third type of tether 24c may be similar to the second type of tether 24b, but connect to the second type of tether 24b at its center. Both eyes of the third type of tether 24c may connect to a roller shackle 22b. The different types of tethers 24 may be made of the same or different materials, and have the same weave pattern and diameters or different parameters, as desired. In the disclosed embodiment, all tethers 24 (as well as sling 20) are fabricated from a polyethylene material. And although only portions of tethers 24 are shown and described as being covered by a sheath or guard, it is contemplated that an entire length of one or more of tethers 24 could alternatively be covered, if desired.

Figure 2:
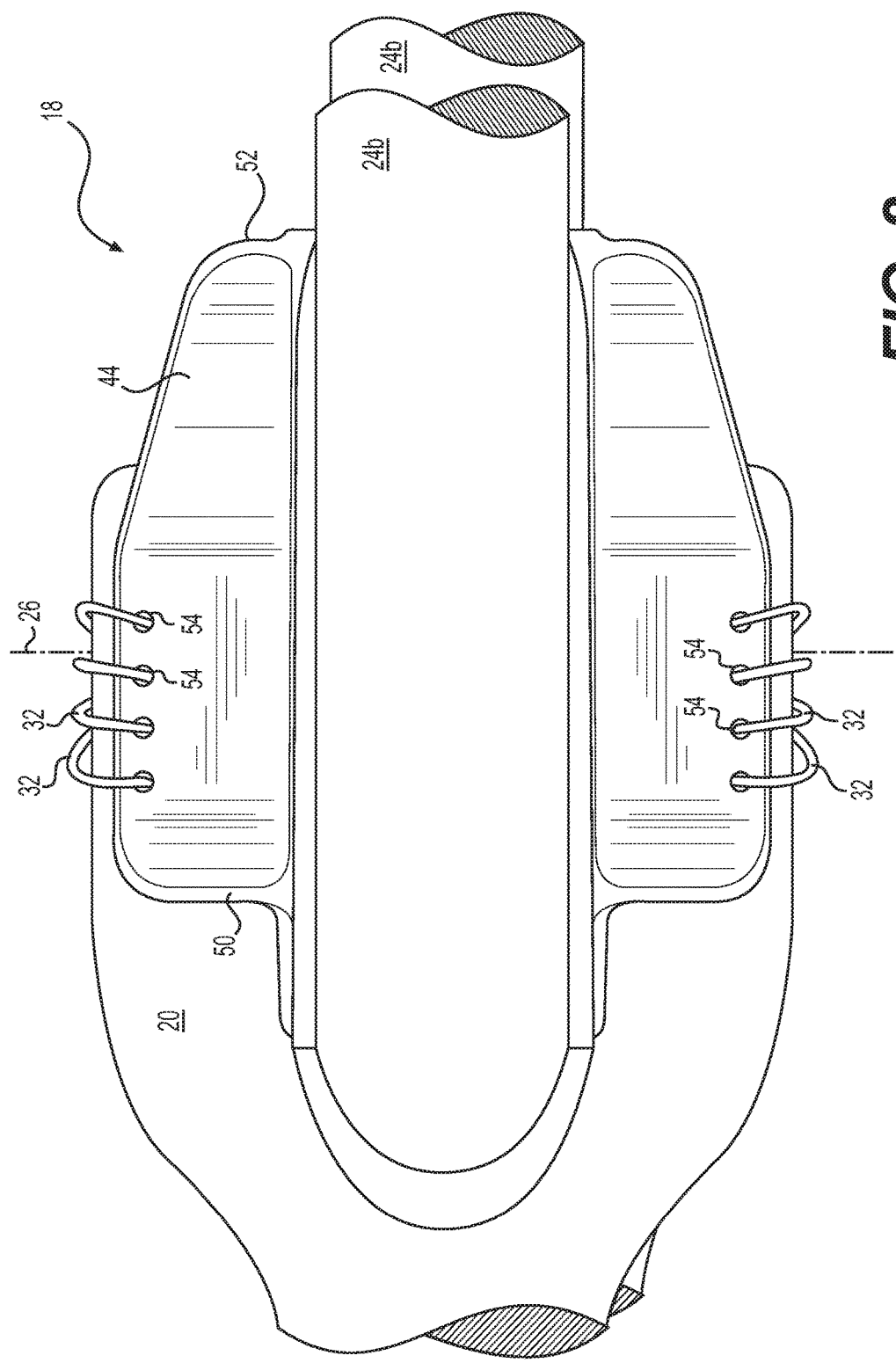
FIGS. 2-4 are isometric illustrations of an exemplary disclosed thimble slider that may form a portion of the tow kit of FIG. 1.

As shown in FIG. 2, the center portion of tether 24b may be configured to pass around thimble slider 18 in a first direction generally concentric with an axis 26, while the eyes 20a and 20b of sling 20 may pass around thimble slider 18 in a second direction generally orthogonal to the first direction. During towing of machine 10 by machine 12, tether 24b and sling 20 may be configured to rotate and slide with respect to thimble 18, thereby balancing a load in the vertical and horizontal directions. In particular, when machines 10 and 12 become transversely misaligned (referring to FIG. 1), tether 24b may slide around thimble slider 18 (i.e., around axis 26) while thimble slider 18 shifts to the left or right (when viewed from an operator's perspective inside machine 10 or 12). This may result in one leg of tether 24b becoming a different length than the other leg. As this sliding and shifting occurs, the loads being passed through each leg of tether 24b may remain about the same. Similarly, when machines 10 and 12 become vertically misaligned (and/or when thimble slider 18 rises or falls relative to machines 10, 12), the eyes of sling 20 may similarly slide in a vertical direction around thimble slider 18. As this happens, the loads being passed through each leg of sling 20 may remain about the same. The sheaths encompassing tether 24a and sling 20 at thimble slider 18 may help to reduce wear of these components during the relative sliding. By providing two degrees of rotational freedom between thimble 18 and tethers 24, the likelihood of unbalanced loading or tether twisting or binding may be reduced.

Figure 3:
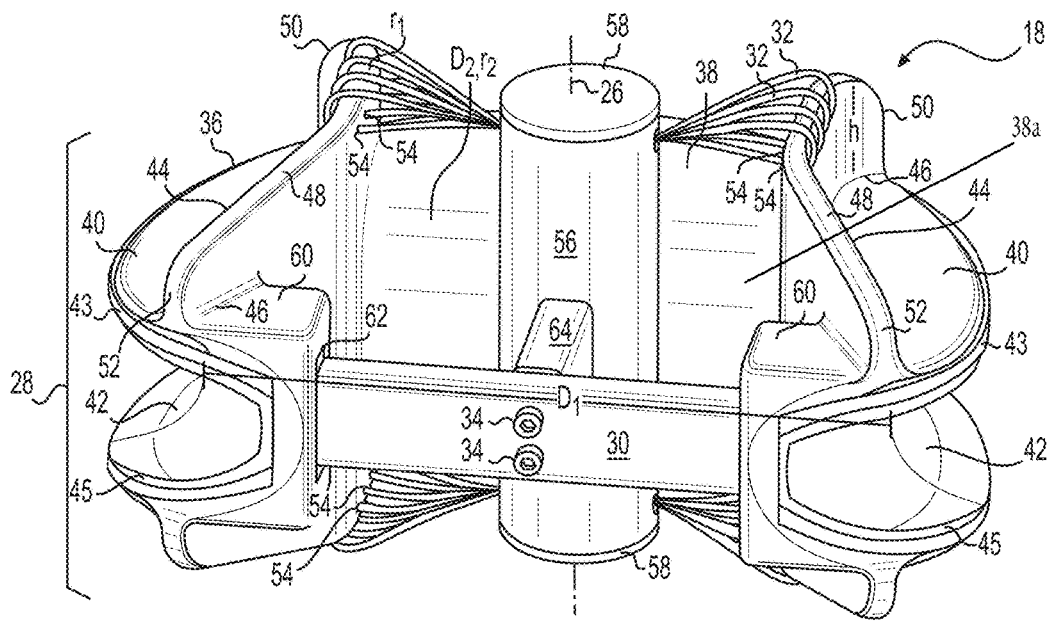
Figure 4:
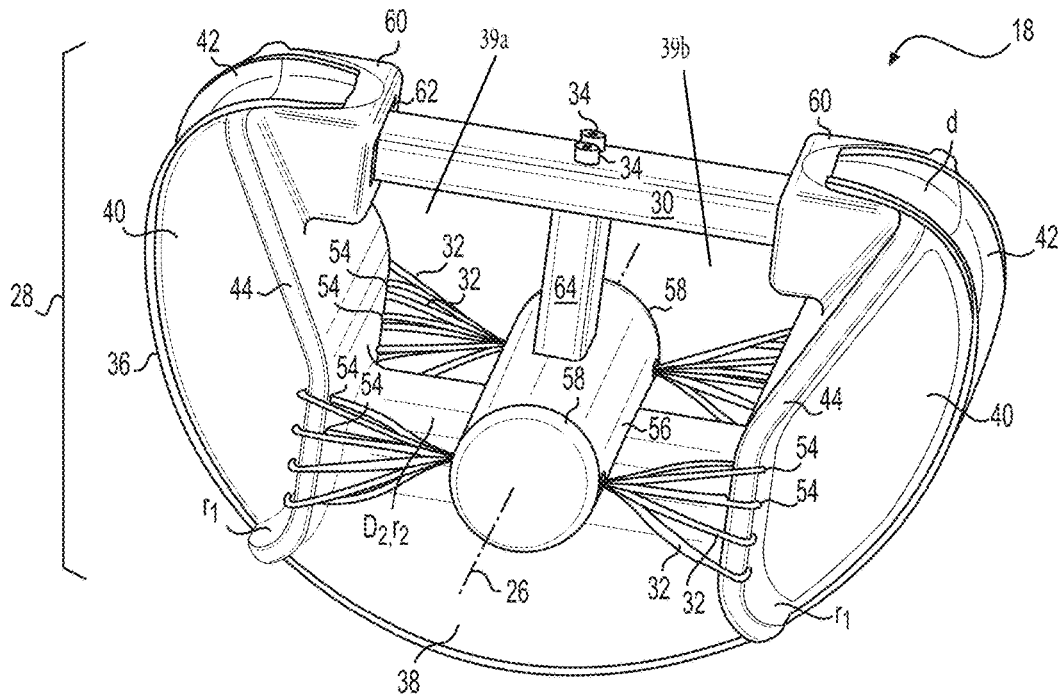

As shown in FIGS. 2-4, thimble slider 18 may be an assembly of multiple components. In particular, thimble slider 18 may include a base component 28 that is fabricated through a casting process, a release guard 30, and cordage 32 used to lace sling 20 (referring to FIG. 2) in place. Release guard 30 may be removably connected to base component 28 by way of one or more threaded fasteners 34.

Base component 28 may include a generally C-shaped body 36 (C-shape shown in FIG. 4) having a center or back portion 38, and opposing end portions 40. A channel 42 may be formed within an outer annular surface 43 of body 36 and configured to receive tether 24b. Channel 42 may be coated with a polymer film 45 (shown only in FIG. 3) that reduces wear of tether 24b (and/or the associated sheath) during relative sliding. Wear is reduced by reducing friction, which also improves sliding and equalization of force across the tether ends. In one embodiment, a diameter d of channel 42 may be about the same diameter of the sheath around tether 24b (e.g., less than about 10% greater than a diameter of tether 24b), and about ⅓-⅕ of a diameter $D_1$ across body 36 (i.e., the diameter across body 36 may be about 3-5 times the diameter of channel 42). This diametrical relationship may help reduce breakage of tether 24b under high loading. For this same reason, an internal surface 38a of back portion 38 may be curved and have a diameter $D_2$ about 3-5 times a diameter of sling 20 that wraps around back portion 38. Diameter $D_1$ may be about equal to diameter $D_2$.

A flange 44 may extend in the same general direction as axis 26 from body 36 at each end portion 40. Flanges 44 may extend from both sides of body 36, and function as guides for sling 20 and also as support structures that inhibit twisting of body 36. Flanges 44 may extend to a height h above body 36 that is about equal to or less than the diameter of sling 20. Flanges 44 may have an inner edge 46 connected to body 36, an outer edge 48, and ends 50, 52 that connect inner and outer edges 46, 48. End 50 may be oriented toward sling 20, while end 52 may be oriented away from sling 20. In this configuration, it may be possible for sling 20 to rub against ends 50 during machine misalignment. For this reason, in some embodiments, ends 50 may flare outward away from sling 20. For example, ends 50 may curve outward with a radius $r_1$ about the same as an internal radius $r_2$ of back portion 38.

Outer edge 48 of flange 44 may be perforated to receive cordage 32. In particular, a plurality of holes 54 may be formed along edge 48, in general alignment with each other. With this configuration, after the eyes of sling 20 are properly installed around back portion 38, cordage 32 may be laced between holes 54 of the opposing flanges 44 at each side of thimble slider 18 to retain sling 20 in place.

In the disclosed application, an elongated separator 56 (shown only in FIGS. 3 and 4) may be connected to (i.e., integrally formed with) back portion 38 and used to separate the eyes of sling 20 in the transverse direction. In the disclosed embodiment, separator 56 is generally cylindrical, and aligned with axis 26, although other shapes and alignments may be possible. Separator 56 may be connected to a center of back portion 38 to create two substantially equal spaces 39a and 39b that each receive an eye of sling 20. Separator 56 may extend past opposing sides of back portion 38 and have a height about equal to the height h of flanges 44. The separation of the eyes of sling 20 provided by separator 56 may increase a stability of thimble slider 18, thereby inhibiting twisting of thimble slider 18 during use. Caps 58 may be connected to the ends of separator 56 to inhibit the ingress of debris or moisture.

Release guard 30 may be fabricated as a standalone component, and removably connected to base component 28 at three locations. In particular, release guard 30 may fabricated from square or rectangular bar stock, and extend transversely between end portions 40. At this location, release guard 30 may be used to maintain a desired separation of end portions 40 during use (e.g., when tether 24b exerts inward forces on end portions 40 urging them together) and also to inhibit unintentional release of sling 20 from thimble 18. In the disclosed embodiment, a protrusion 60 may extend inward from a tip of each end portion 40, and a recess 62 may be formed within each protrusion 60 to receive an associated end of release guard 30. Recess 62 may be generally arcuate, such that release guard 30 is assembled to base component 28 by rotation about its midpoint in a vertical direction (relative to perspective of FIG. 3). Fasteners 34 may be inserted through release guard 30 after this rotation, to hold release guard 30 in place at a general midpoint of separator 56. Once in position, release guard 30 may resist outward movement away from separator 56 (i.e., movement that could allow disengagement of sling 20) by way of engagement with edges of recesses 62 and by fasteners 34. In the disclosed embodiment, a spacer 64 is positioned between separator 56 and release guard 30. Spacer 64 may be integral with base component 28 (e.g., extend from separator 56) or release guard 30, as desired. It is also contemplated that spacer 64 may be a completely separate component or entirely omitted, if desired.

FIGS. 6-9 illustrate an alternative thimble slider assembly 18 relative to FIGS. 2-4. As shown, common components among the two embodiments are given the same reference number even though they may be configured slightly differently, such as separator 56 (i.e., circular cylindrical in FIGS. 2-4; oblong cylindrical in FIGS. 6-9). As shown in FIGS. 6-9, thimble slider 18 may be an assembly of multiple components. In particular, thimble slider 18 may include a base component 28 that is fabricated through a casting process, sling release guard 30, and tether release guard 47 used to retain tether 24b in channel 42 (referring to FIG. 1).

Figure 6:
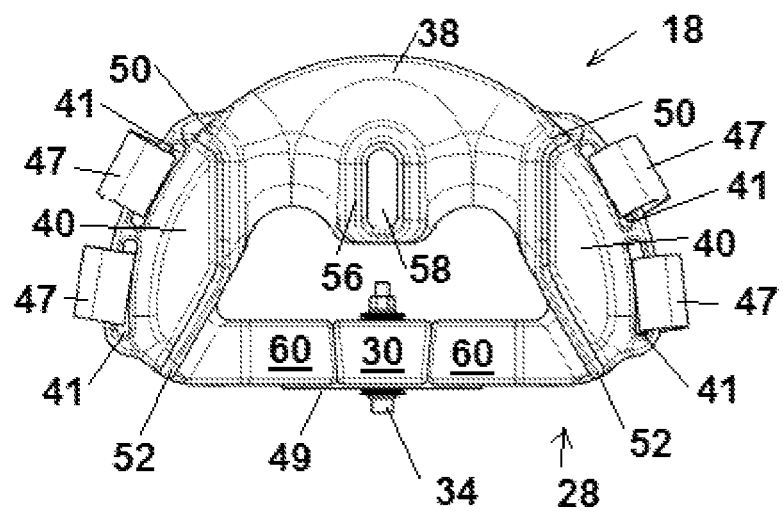
FIGS. 6-9 are isometric illustrations of a second exemplary disclosed thimble slider that may form a portion of the tow kit of FIG. 1.

As shown in FIG. 6, base component may include a generally C-shaped body having a center or back portion 38, and opposing end portions 40. A channel 42 may be formed within an outer annular surface of the body and configured to receive tether 24b. As discussed above, channel 42 may be coated with a polymer film that reduces wear of tether 24b (and/or the associated sheath) during relative sliding. Wear is reduced by reducing friction, which also improves sliding and equalization of force across the tether ends. In one embodiment, a diameter of channel 42 may be about the same diameter of the sheath around tether 24b (e.g., less than about 10% greater than a diameter of tether 24b), and about ⅓-⅕ of a diameter across body 36 (i.e., the diameter across body 36 may be about 3-5 times the diameter of channel 42). This diametrical relationship may help reduce breakage of tether 24b under high loading. For this same reason, an internal surface of back portion 38 may be curved and have a diameter about 3-5 times a diameter of sling 20 that wraps around back portion 38.

Unlike the embodiment shown in FIGS. 2-4, this embodiment includes at least one tether release guard 47 to retain a tether in channel 42. This is particularly helpful in keeping the tether positioned in the channel 42 until the tether and tow kit 14 is placed in tension. As should be understood, this release guard 47 can be configured many different ways. For example, metal or other rigid components can be put in place along the channel via clamping, fastening, force fitting, snap fit, sliding engagement, etc. However, as illustrated, cordage, Velcro, elastic bands, and other flexible fastening means can be used to hold the tether in place. In particular, the illustrated release guard 47 comprised Velcro bands secured in apertures 41 of the body of the base component 28. Velcro or other durable, quick releasing retaining means is preferred because it allows for quick and easy opening and closing of the channel to insert and retain a tether respectively. In this particular configuration, a pair of release guards 47 are coupled to the end portion 40 on each side of the body and extend across the channel 42. As illustrated, the release guards 47 are coupled to the end portions 40 via several apertures 41 positioned adjacent the peripheral edge of the body. In some embodiments, fewer release guards 47 may be used. Also, the other embodiments, release guards may be placed in different locations such as along the base portion 38 instead of the end 40.

Figure 7:
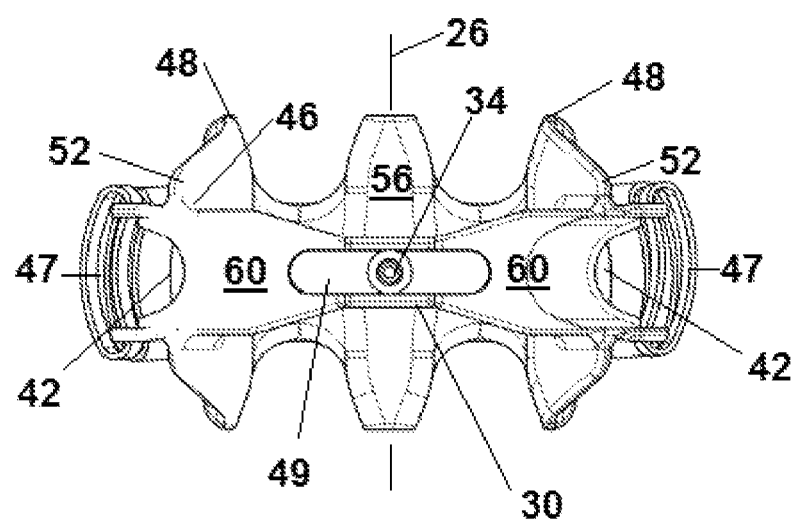
Figure 8:
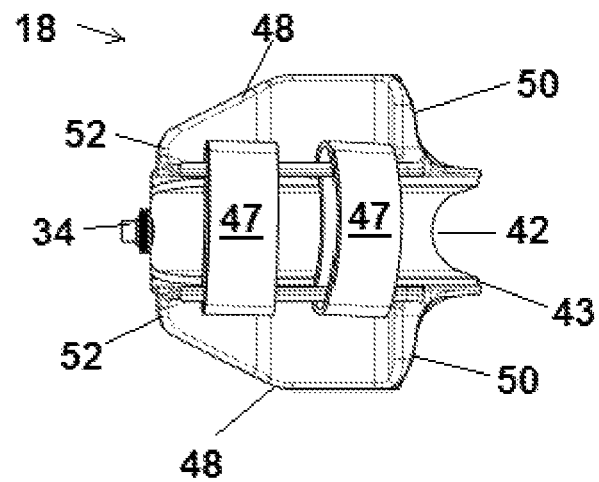
Figure 9:
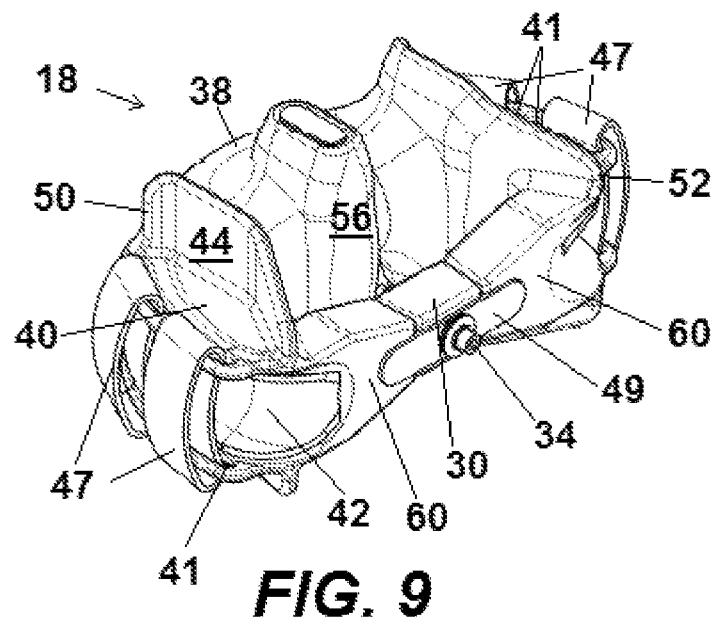

As best illustrated in FIGS. 7 and 9, a flange 44 may extend in the same general direction as axis 26 from the body at each end portion 40. Flanges 44 may extend from both sides of the body, and function as guides for sling 20 and also as support structures that inhibit twisting of the body. Flanges 44 may extend to a height above body 36 that is about equal to or less than the diameter of sling 20. Flanges 44 may have an inner edge 46 connected to the body, an outer edge 48, and ends 50, 52 that connect inner and outer edges 46, 48. End 50 may be oriented toward sling 20, while end 52 may be oriented away from sling 20. In this configuration, it may be possible for sling 20 to rub against ends 50 during machine misalignment. For this reason, in some embodiments, ends 50 may flare outward away from sling 20. For example, ends 50 may curve outward with a radius about the same as an internal radius of back portion 38.

In the disclosed application, an elongated separator 56 (shown only in FIGS. 6, 7 and 9) may be connected to (i.e., integrally formed with) back portion 38 and used to separate the eyes of sling 20 in the transverse direction. In the disclosed embodiment, separator 56 is generally cylindrical, and aligned with axis 26 (see FIG. 7), although other shapes and alignments may be possible. Separator 56 may be connected to a center of back portion 38 to create two substantially equal spaces that each receives an eye of sling 20. Separator 56 may extend past opposing sides of back portion 38 and have a height about equal to the height of flanges 44. The separation of the eyes of sling 20 provided by separator 56 may increase a stability of thimble slider 18, thereby inhibiting twisting of thimble slider 18 during use.

The release guard 30 of FIGS. 6-9 is configured different than the release guard 30 of FIGS. 2-4. As shown, the release guard may be fabricated as a standalone component, and removably connected to base component at two locations—not three as shown in FIGS. 2-4. In particular, release guard 30 may extend transversely at least partially between end portions 40. At this location, release guard 30 may be used to maintain a desired separation of end portions 40 during use (e.g., when tether 24b exerts inward forces on end portions 40 urging them together) and also to inhibit unintentional release of sling 20 from thimble 18. In this particular embodiment, a protrusion 60 may extend inward from a tip of each end portion 40 to define a recess formed between each protrusion 60 to receive an associated end of release guard 30.

As illustrated in FIG. 6, the ends of each protrusion 60 are angled such that the release guard 30 must have generally matching angular surfaces to properly engage each protrusion 60. As shown, this generally matching profile results in the release guard 30 having a generally trapezoidal shape. With such a shape, the release guard only needs to be secured on one side in the radial direction (relative to axis 26).

In the illustrated embodiment of FIGS. 6-9, the release guard is secured in place with fastener 34 and bridging member 49. In particular, the fastener 34 may be inserted through release guard 30 and bridging member 49. The bridging member is shaped and configured to extend or bridge across the gap defined by the two protrusions 60. More particularly, it is secured to the release member 30 on the short base side of the trapezoid configuration. As illustrated, the shown bridging member 49 has a generally rectangular shape. The ends of the illustrated bridging member 49 are semi-circular. However, other configurations and shapes are possible.

The bridging member 49 can be rotatably fastened to the release member 30 so it can be rotated into a generally vertical orientation (relative to FIG. 7) during installation and later rotated to a generally horizontal orientation (relative to FIG. 7—as shown) to be secured in place. To secure and hold bridging member 49 and release guard 30 in place, the fastener 34 is tightened once the release guard is put in place (as shown). Once in position, release guard 30 may resist outward movement away from separator 56 by way of the wedging arrangement of the angled faces of the protrusions 60 and release guard 30. Inward movement is resisted by the bridging member 49 extending from first protrusion 60 to second protrusion 60.

Although one exemplary thimble slider 18 was presented in FIGS. 2-4 and a second exemplary thimble slider 18 was presented in FIGS. 6-9, it does not mean that distinct features of the two embodiments cannot be combined. For example, in some embodiments, the cordage 32 in flange 44 of the first embodiment can be used on the second embodiment of FIGS. 6-9. Alternatively, tether release guard 47 may be added to the first embodiment of FIGS. 2-4.

Figure 5:
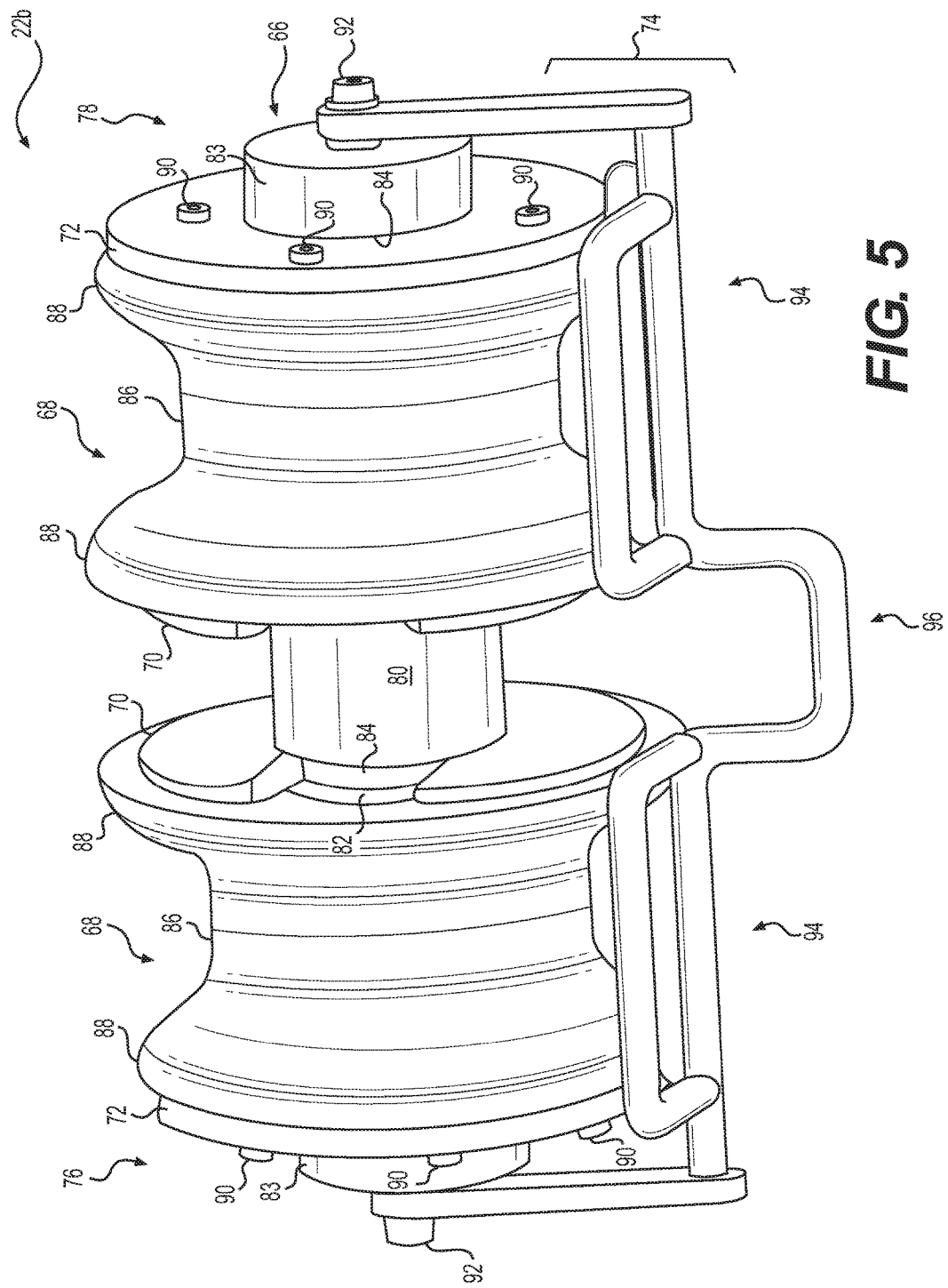
FIG. 5 is an isometric illustration of an exemplary disclosed roller shackle that may form a portion of the tow kit of FIG. 1.

FIG. 5 illustrates an exemplary embodiment of roller shackle 22b, which may be used together with thimble slider 18 in tow kit 14. As can be seen from this figure, roller shackle 22b may be an assembly of components, including a pin 66, two rollers 68, two retainers 70, two end plates 72, and a guard 74. Pin 66 may be configured to pass through bracket 16 (referring to FIG. 1) of machine 10, and retainers 70 may be used to hold pin 66 in place. Rollers 68 may then each be passed over a corresponding end of pin 66, and plates 72 may be used to secure rollers 68. Guard 74 may be connected to pin 66 after the eyes of tether 24c are passed over rollers 68 to inhibit unintentional disconnect of tether 24c from roller shackle 22b.

Pin 66 may be a forged steel component having a first end 76, a second end 78, and plurality of lands (areas of larger diameter) separated by annular grooves (areas of smaller diameter) and located between ends 76, 78. For example, pin 66 may have a center land 80 configured to slide inside a bore (not shown) of bracket 16, a side land 82 located at either side of center land 80 (only one side land 82 shown in FIG. 5), and an end land 83 between center land 80 and each of first and second ends 76, 78. An annular groove 84 may be located between center land 80 and each of side lands 82, and also between each side land 82 and a corresponding end land 83. An axial length of lands 82 may be about two times an axial length of land 80 and each of lands 83. In the disclosed embodiment, the outer diameters of all lands 80, 82, 83 are about the same, and the outer diameters of all grooves 84 are about the same.

Rollers 68 may each be an aluminum spool having a groove 86 generally centered between end flanges 88. Grooves 86 may have a semicircular cross-section and be configured to separately receive the eyes of tether 24c (including any sheaths—not shown) at spaced apart locations. The internal surface of each groove 86 may be generally smooth, and extend over the outer edges of the associated flanges 88. In the disclosed embodiment, flanges 88 of each roller 68 have outer diameters that are different. For example, the inner flange 88 has a larger diameter than the outer flange 88 to help ensure that tether 24c does not rub against sharp metallic edges of bracket 16 located over center land 80. It is contemplated, however, that in different applications, this diametrical relationship may be reversed (e.g., when pin 66 is supported at outer ends 76, 78), if desired, or that flanges 88 may have identical diameters. Rollers 68 may each be configured to provide a sliding surface for the eyes of tether 24c, and also to rotationally slide over the outer surfaces of lands 82. In this manner, tether 24c may easily move and reposition itself during towing of machine 10, without causing significant friction or undue wear of tether 24c.

Retainers 70 may be C-type clips each having an opening at one side that is configured to expand slightly when being placed over pin 66 and then contract back to a smaller size after being received within groove 84. When in the contracted state within grooves 84, retainers 70 may not be unintentionally removed from pin 66. Retainers 70 may be plate-like, and extend radially outward a distance past lands 80 and 82 to engage bracket 16, thereby sandwiching bracket 16 and inhibiting significant axial movement of pin 66. In the disclosed embodiment, rollers 68 may be assembled onto pin 66 only after retainers 70 are in place.

Plates 72 may be generally flat cylindrical disks, each comprising two substantially identical halves that are received from opposing sides of pin 66 within a corresponding groove 84. Plates 72 may have an inner diameter that is less than an outer diameter of lands 82 and 83, and an outer diameter that is greater than an inner diameter of rollers 68. With this arrangement, when plates 72 are pressed up against lands 82 inside of grooves 84, rollers 68 may be inhibited from significant outward axial movement (i.e., plates 72 may prevent removal of rollers 68). A plurality of fasteners 90 may pass through each plate 72 after assembly within groove 84 to engage a corresponding one of rollers 68, thereby inhibiting unintentional removal of plate 72.

Guard 74 may be included in some embodiments to inhibit the eyes of tether 24c from falling off roller shackle 22b during setup of tow kit 14. In the disclosed embodiment, guard 74 has a structure fabricated from wire rods that is connected to the opposing ends 76, 78 of pin 66 via fasteners 90. The structure may include a V-shaped portion 92 located at each roller 68 that is configured to pass around a lower side of the roller 68, and a center portion 94 protruding away from center land 80 that creates a clearance for bracket 16 (referring to FIG. 1). It is contemplated that guard 74 may have another shape and/or configuration, if desired. It is also contemplated that guard 74 may be omitted in some applications.

INDUSTRIAL APPLICABILITY

The disclosed tow kit may be applicable to any mobile application, where transfer of forces between two machines is required. The disclosed tow kit may allow connection of a tow machine to a disabled machine having a gross vehicle weight of 700 tons or more. The disclosed tow kit may be lightweight, simple, durable, and intended for installation by a single technician. Use of tow kit 14 will now be described with respect to FIG. 1.

Setup of tow kit 14 may begin with assembly of thimble slider 18. In particular, a single technician may move thimble slider 18 to a location on the ground surface about midway between machines 10 and 12, with axis 26 (referring to FIGS. 2-4) oriented generally vertically. One eye of two different tethers 24a may each be passed around an opposing end of sling 20, and then the eyes of sling 20 may be placed around end portions 40 of thimble slider 18 at either side of separator 56 and over back portion 38. In some applications, tethers 24a and sling 20 may never be disconnected from each other after the first towing setup, in order to facilitate a simpler subsequent setup. After the ends of sling 20 are correctly connected to thimble slider 18, release guard 30 may be rotated into recesses 62 of protrusions 60, and fasteners 34 used to lock release guard 30 into a position at which sling 20 may not be removed. Cordage 32 may then be laced through holes 54 to help retain the eyes of sling 20 in place. One eye of tether 24b may then be passed through the eyes of sling 20, and a midpoint of tether 24b (which may be covered with a sheath in some applications) may be set in place within channel 42 of thimble slider 18. One tether 24c may then be passed through each eye of tether 24b, until a sheathed midpoint is resting therein.

The technician may then connect tethers 24 to shackles 22, and shackles 22 to machines 10 and 12. In the case of a traditional shackle 22a, it may take two technicians to carry and assembly it to machine 10 or 12, as the weight of such a shackle 22a could be over 50 lbs. To assemble a traditional shackle 22a to machine 10 or 12, a traditional clevis pin may be removed from the shackle 22a, the eye of one tether 24a may be placed over an end of a U-shaped casting, bores of the casting may be aligned with a bore in bracket 16, and the clevis pin may be reinserted.

In many applications, it may be simpler to use roller shackle 22b to connect tethers 24 to machine 10 and/or 12. In particular, roller shackle 22b may be lighter weight (e.g., less than about 50 lbs), allowing a single technician to perform the assembly. In addition, the geometry of roller shackle 22b may result in less wear of the associated tether 24 and improved load balancing. The first step in connecting roller shackle 22b to machine 10 or 12 may include passing pin 66 through the bore of bracket 16 until center land 80 is resting within the bore. Retainers 70 may then be engaged with grooves 84 to retain pin 66 in place, and then rollers 68 may be slid onto lands 82 from opposing ends 76, 78 of pin 66. Thereafter, the two paired halves of each of plates 72 may be placed into grooves 84 from opposing sides of pin 66, at ends 76 and 78 of pin 66, and fasteners 90 used to secure plates 72. The eyes of tether 24c may then be placed over respective grooves 86 of rollers 68, and guard 74 installed to inhibit unintentional removal of tether 24c.

During towing of machine 10 by machine 12, tethers 24 may be allowed to slip somewhat and thereby adjust load balancing among the different legs of tethers 24. For example, tether 24b may be allowed to rotate in a clockwise or counterclockwise direction (viewed from the perspective of FIG. 1) within channel 42 of thimble slider 18, should machine 12 become transversely misaligned with machine 10. In another example, the eyes of sling 20 may be allowed to rotate around back portion 38 of thimble slider 18 during vertical misalignment. Further, the eyes of tether 24b may be allowed to vertically rotate within grooves 86 of rollers 68, and rollers 68 may likewise rotate about pin 66. These different rotations may be facilitated by smooth curved interfaces, which could reduce friction and wear of the associated tethers.

It will be apparent to those skilled in the art that various modifications and variations can be made to the disclosed tow kit and thimble slider without departing from the scope of the disclosure. Other embodiments of the tow kit and thimble slider will be apparent to those skilled in the art from consideration of the specification and practice of the hitch assembly disclosed herein. For example, although tow kit 14 is shown as having only two roller shackles 22b associated with only the stuck machine 10, it is contemplated that four roller shackles 22b could be included and associated also with machine 12. In this situation, tow kit 14 would omit tether 24a and instead include additional tethers 24b and 24c. It is further contemplated that two thimble sliders 18 could be included within tow kit 14 and used at each end of sling 20. It is intended that the specification and examples be considered as exemplary only, with a true scope being indicated by the following claims and their equivalents.

What is claimed is:
1. A thimble slider, comprising:
a generally C-shaped body having a back portion and opposing end portions;
a channel formed within outer surfaces of the back and opposing end portions; and an elongated separator connected to an inner surface of the back portion and extending in a direction generally orthogonal to a length direction of the back portion,
wherein an inner surface of the channel is coated with a friction reducer.

2. The thimble slider of claim 1, wherein the channel has a generally semi-circular cross-section.

3. The thimble slider of claim 2, wherein:
the elongated separator divides an interior of the generally C-shaped body into two substantially identical spaces; and
the inner surface of the back portion is curved and generally concentric with the channel.

4. The thimble slider of claim 1, further including a release guard located at a side of the elongated separator opposite the back portion of the generally C-shaped body.

5. The thimble slider of claim 4, wherein the opposing end portions of the generally C-shaped body each includes a recess configured to receive an end of the release guard.

6. The thimble slider of claim 5, further including at least one fastener configured to removably connect the release guard to the elongated separator.

7. The thimble slider of claim 1, further including a flange extending from each side of the generally C-shaped body at each of the opposing ends in a direction generally aligned with an axis of the elongated separator.

8. The thimble slider of claim 7, wherein:
the flange has an inner edge connected to the generally C-shaped body, an outer edge, and ends connecting the inner and outer edges; and
the ends flare outward away from the elongated separator.

9. The thimble slider of claim 8, further including a plurality of holes formed in the flange along the outer edge.

10. The thimble slider of claim 9, further including cordage laced through the plurality of holes.

11. The thimble slider of claim 8, wherein a flare curvature of the ends of the flange is about the same as a curvature of the inner surface of the back portion of the generally C-shaped body.

12. The thimble slider of claim 1, wherein a diameter across the generally C-shaped body is about 3-5 times a diameter of the channel.

13. The thimble slider of claim 1, further comprising a tether release guard selectively extending across the channel to releasably retain a tether within the channel.

14. The thimble slider of claim 13, further including a sling release guard located opposite the back portion of the generally C-shaped body.

15. The thimble slider of claim 14, further including at least one fastener configured to removably connect the sling release guard to the generally C-shaped body.

16. The thimble slider of claim 1, wherein the friction reducer is a polymer coating.

17. A tow kit for connecting a first machine to a second machine, the tow kit comprising:
a thimble slider, including:
a generally C-shaped body having a back portion and opposing end portions;
a generally semi-circular channel formed within outer surfaces of the back and opposing end portions;
an elongated separator connected to an inner surface of the back portion and extending in a direction generally orthogonal to a length direction of the back portion, the elongated separator dividing an interior of the generally C-shaped body into a first space and a second space; and
a sling having a first end passing through the first space in the generally C-shaped body of the thimble slider, and a second end passing through the second space;
at least a first tether passing through the channel of the thimble slider and having ends coupled to the first machine; and
at least a second tether having a first end configured to receive the sling and a second end connected to the second machine.

* * * * *